No. 653,019. Patented July 3, 1900.
W. L. FAXON.
HAND WEEDING TOOL.
(Application filed Nov. 11, 1899.)
(No Model.)
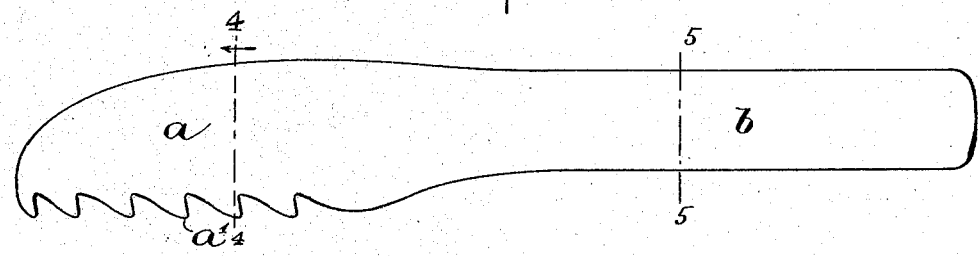
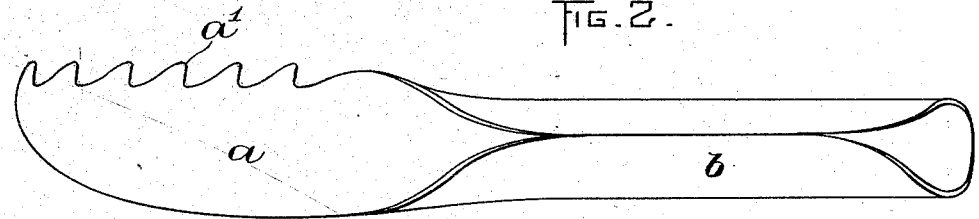
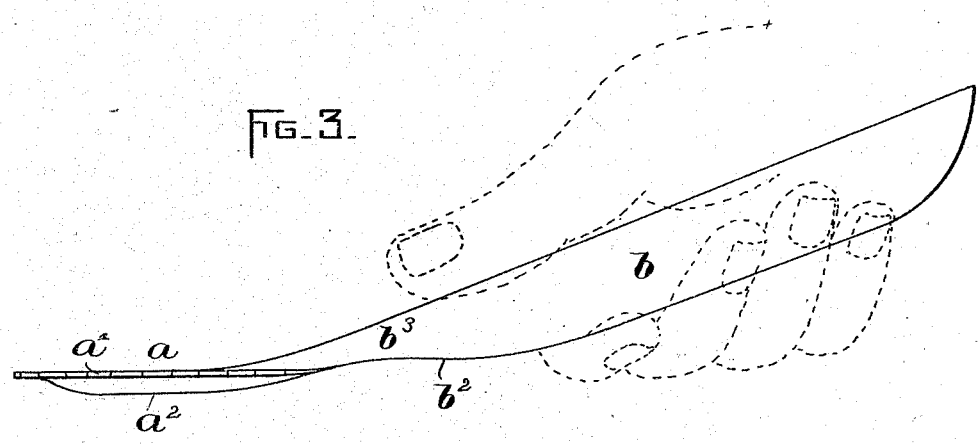
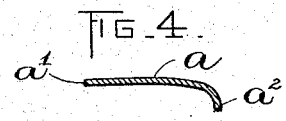
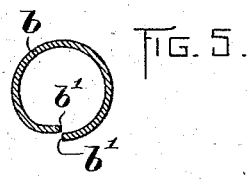
WITNESSES
INVENTOR:

UNITED STATES PATENT OFFICE.

WILLIAM L. FAXON, OF MIDDLEBOROUGH, MASSACHUSETTS, ASSIGNOR OF ONE-HALF TO CORNELIUS H. LEONARD AND THOMAS S. HODGSON, OF SAME PLACE, AND ISAAC SAMPSON, OF LAKEVILLE, MASSACHUSETTS.

HAND WEEDING-TOOL.

SPECIFICATION forming part of Letters Patent No. 653,019, dated July 3, 1900.

Application filed November 11, 1899. Serial No. 736,645. (No model.)

*To all whom it may concern:*

Be it known that I, WILLIAM L. FAXON, of Middleborough, in the county of Plymouth and State of Massachusetts, have invented certain new and useful Improvements in Hand Weeding-Tools, of which the following is a specification.

This invention has for its object to provide a simple and efficient implement adapted to be wielded by one hand of the operator and to rapidly and effectively withdraw weeds, including the roots, from the ground or sever the tops from the roots below the surface of the ground.

The invention also has for its object to provide a tool of the character mentioned with a handle which shall be sufficiently flexible to prevent cramping of the fingers when the tool is continuously grasped for a considerable period of time.

The invention also has for its object to provide a weeding-tool adapted to be held in the hand and at the same time permit the comparatively-free use of the thumb and fingers in performing work for which the weeder is not required, the weeder being at the same time held in the hand in readiness for use.

The invention consists in the improvements which I will now proceed to describe and claim.

Of the accompanying drawings, forming a part of this specification, Figure 1 represents a top view of a weeding-tool embodying my invention. Fig. 2 represents a bottom view of the same. Fig. 3 represents an edge view. Fig. 4 represents a section on line 4 4 of Fig. 1. Fig. 5 represents a section on line 5 5 of Fig. 1.

The same letters of reference indicate the same parts in all the figures.

My improved weeding-tool comprises an elongated blade $a$, having teeth or serrations $a'$ on one of its longer edges, the back of the blade being preferably curved downwardly, as indicated at $a^2$ in Fig. 4, to impart sufficient stiffness to the blade to enable it to be forced through the ground and exert the desired degree of force upon the roots of weeds. The blade $a$ is preferably made of sheet metal and with it is integrally formed a handle $b$, which is an extension of the blank from which the blade is formed, said extension being bent into the form of a tube adapted to be readily grasped in the hand. The edges $b'$ $b'$ of the extension from which the handle $b$ is formed are preferably slightly offset from each other, as shown in Fig. 5, so that the tubular handle is slightly yielding or compressible. I have found that this yielding handle enables the tool to be grasped and held for a long period of time without as much fatigue and without the liability of cramping the fingers which would be involved if the handle were rigid.

The handle is inclined relatively to the blade and stands at an obtuse angle therewith, as shown in Fig. 3, so that when the blade is being worked in a horizontal position at and below the surface of the ground the part of the handle with which the hand is in contact will be sufficiently elevated above the ground to enable the fingers to clear the ground. In other words, when the handle is held in an inclined position above the surface of the ground the blade projects horizontally from the lower end of the handle away from the grip portion of the handle. The lower portion of the handle is beveled at $b^2$, forming a narrow neck $b^3$, which connects the handle with the blade, this neck being of such form that it can readily move through the ground when the blade $a$ is working below the surface.

The tool described is or may be operated by the grasp, as indicated in Fig. 3, where the dotted lines show the position of the thumb and fingers. The plane of the blade is sufficiently below the thumb and fingers when the blade is held horizontally to enable it to be moved back and forth below the surface of the ground, the serrations enabling the roots of weeds to be either pulled out or cut off, as may be desired, and all without raising or removing the surface of the ground. The roots of spreading grass may be easily cut off by this improved tool and the grass removed without disturbing plants in close proximity. Plants such as beets, carrots, onions, &c., can be thinned out with the improved weeder, and the removed plants can be withdrawn from the row without the use of the thumb and finger.

The weeder is so constructed that it can be retained in the hand, while a general use of the hand for other purposes is permitted without releasing the hold on the weeder.

I claim—

1. A weeding implement comprising a grip or handle formed to be held in the hand, and an elongated blade formed on and projecting from one end of the handle and having a serrated longer edge, the blade and its serrated edge standing at an obtuse angle with the handle and constituting an extension thereof, the relative arrangement of the handle and blade being such that when the handle is held in an inclined position above the surface of the ground, the blade projects horizontally from the lower end of the handle, away from the grip portion thereof.

2. A weeding implement comprising a blade having a serrated front edge, and a downwardly-curved rear edge, and an inclined handle joining the inner portion of the blade.

3. A weeding implement comprising a sheet-metal blade, and a sheet-metal handle integral therewith, the blade having a serrated front edge and a downwardly-curved rear edge, while the handle is inclined relatively to the blade and is approximately tubular and elastic or compressible in cross-section.

In testimony whereof I have affixed my signature in presence of two witnesses.

WILLIAM L. FAXON.

Witnesses:
F. W. HAYDEN,
R. A. BROWN.